United States Patent
Chen et al.

(10) Patent No.: US 10,887,957 B2
(45) Date of Patent: *Jan. 5, 2021

(54) LIGHT EMITTING DIODE DRIVE CIRCUIT WITH SILICON-CONTROLLED RECTIFIER DIMMER, CIRCUIT MODULE AND CONTROL METHOD

(71) Applicant: SILERGY SEMICONDUCTOR TECHNOLOGY (HANGZHOU) LTD, Zhejiang (CN)

(72) Inventors: Huiqiang Chen, Zhejiang (CN); Jianxin Wang, Zhejiang (CN)

(73) Assignee: SILERGY SEMICONDUCTOR TECHNOLOGY (HANGZHOU) LTD, Hangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/448,729

(22) Filed: Jun. 21, 2019

(65) Prior Publication Data

US 2019/0313498 A1    Oct. 10, 2019

Related U.S. Application Data

(63) Continuation of application No. 15/927,256, filed on Mar. 21, 2018, now Pat. No. 10,356,864.

(30) Foreign Application Priority Data

Apr. 6, 2017    (CN) .......................... 2017 1 0219915

(51) Int. Cl.
H05B 33/08 (2020.01)
H02J 1/04 (2006.01)
(Continued)

(52) U.S. Cl.
CPC ................ *H05B 45/10* (2020.01); *H02J 1/04* (2013.01); *H05B 45/37* (2020.01); *H05B 47/10* (2020.01); *H02J 1/002* (2020.01)

(58) Field of Classification Search
None
See application file for complete search history.

(56) References Cited

U.S. PATENT DOCUMENTS 4,728,866 A * 3/1988 Capewell .............. H02M 5/293
                                                 315/224
8,614,551 B2 * 12/2013 Chen ...................... H05B 45/10
                                                 315/200 R
(Continued)

OTHER PUBLICATIONS

Indian First Examination Report regarding Application No. 201814012619 dated Feb. 11, 2020.

*Primary Examiner* — Amy Cohen Johnson
*Assistant Examiner* — Srinivas Sathiraju
(74) *Attorney, Agent, or Firm* — Harness, Dickey & Pierce, P.L.C.

(57) ABSTRACT

An LED drive circuit with a SCR dimmer, a circuit module and a control method therefor are provided. In each cycle of the alternating current, the bleeding current during a time period for turning on the SCR dimmer is distinguished from the bleeding current in a time period from an instant at which the SCR dimmer is turned on to an instant at which the LED load is lit. The bleeder circuit is controlled to perform bleeding at the first current during the time period for turning on the SCR dimmer, and then perform bleeding at the second current which is less than the first current from the instant at which the SCR dimmer is turned on, so that an average bleeding current of the bleeder circuit in each cycle can be reduced, the bleed loss can be reduced, and the efficiency of the LED drive circuit can be improved.

19 Claims, 7 Drawing Sheets

(51) Int. Cl.
*H05B 37/02* (2006.01)
*H02J 1/00* (2006.01)
*H05B 45/10* (2020.01)
*H05B 45/37* (2020.01)
*H05B 47/10* (2020.01)

(56) References Cited

U.S. PATENT DOCUMENTS

| | | | | |
|---|---|---|---|---|
| 8,890,372 B2 * | 11/2014 | Garb | | H01R 13/6675 |
| | | | | 307/140 |
| 8,928,235 B2 * | 1/2015 | Angeles | | H05B 45/37 |
| | | | | 315/200 R |
| 9,125,270 B2 * | 9/2015 | Liao | | H05B 45/10 |
| 9,282,606 B1 * | 3/2016 | Kuang | | H05B 45/37 |
| 9,301,352 B2 * | 3/2016 | Zhu | | H05B 47/10 |
| 9,408,269 B2 * | 8/2016 | Zhu | | H05B 45/37 |
| 9,420,644 B1 * | 8/2016 | Shum | | F21V 3/00 |
| 9,510,407 B2 | 11/2016 | Akiyama | | |
| 9,578,706 B1 * | 2/2017 | Lai | | H05B 45/10 |
| 9,648,676 B2 * | 5/2017 | Angeles | | H05B 45/37 |
| 9,877,367 B2 * | 1/2018 | Wang | | H05B 45/10 |
| 9,912,246 B2 * | 3/2018 | Ilic | | H05B 45/3575 |
| 9,936,552 B1 * | 4/2018 | Lau | | H05B 45/10 |
| 10,037,859 B2 * | 7/2018 | Jin | | H01H 37/32 |
| 10,069,406 B2 * | 9/2018 | Huang | | H03H 11/02 |
| 10,194,500 B2 * | 1/2019 | Zhu | | H05B 47/10 |
| 10,306,722 B2 * | 5/2019 | Lai | | H05B 45/10 |
| 10,356,864 B2 * | 7/2019 | Chen | | H05B 45/37 |
| 2011/0121744 A1 * | 5/2011 | Salvestrini | | H05B 45/50 |
| | | | | 315/246 |
| 2011/0163600 A1 * | 7/2011 | Garb | | H01R 13/6675 |
| | | | | 307/35 |
| 2012/0212145 A1 * | 8/2012 | Chan | | H05B 45/37 |
| | | | | 315/200 R |
| 2013/0057167 A1 * | 3/2013 | Angeles | | H05B 45/00 |
| | | | | 315/200 R |
| 2014/0062322 A1 * | 3/2014 | Yu | | H05B 45/10 |
| | | | | 315/200 R |
| 2014/0132172 A1 * | 5/2014 | Zhu | | H05B 45/10 |
| | | | | 315/210 |
| 2014/0300289 A1 * | 10/2014 | Zhu | | H05B 47/10 |
| | | | | 315/206 |
| 2014/0346973 A1 * | 11/2014 | Zhu | | H05B 47/10 |
| | | | | 315/307 |
| 2015/0054418 A1 * | 2/2015 | King | | H05B 45/37 |
| | | | | 315/209 R |
| 2015/0366018 A1 * | 12/2015 | Kuang | | H05B 45/37 |
| | | | | 315/206 |
| 2016/0156275 A1 * | 6/2016 | Ilic | | H05B 45/00 |
| | | | | 315/209 R |
| 2016/0366735 A1 * | 12/2016 | Tian | | H05B 45/37 |
| 2018/0295685 A1 * | 10/2018 | Wang | | H05B 45/10 |
| 2018/0295690 A1 * | 10/2018 | Chen | | H05B 45/3575 |
| 2018/0310376 A1 * | 10/2018 | Huang | | H05B 45/44 |

* cited by examiner

LIGHT EMITTING DIODE DRIVE CIRCUIT WITH SILICON-CONTROLLED RECTIFIER DIMMER, CIRCUIT MODULE AND CONTROL METHOD

CROSS REFERENCE TO RELATED APPLICATION

The present application is a continuation of U.S. patent application Ser. No. 15/927,256 filed on Mar. 21, 2018, which claims the priority to Chinese Patent Application No. 201710219915.5, titled "LIGHT EMITTING DIODE DRIVE CIRCUIT WITH SILICON-CONTROLLED RECTIFIER DIMMER, CIRCUIT MODULE AND CONTROL METHOD", filed on Apr. 6, 2017 with the State Intellectual Property Office of the People's Republic of China, which are incorporated herein by reference in their entirety.

FIELD

The present disclosure relates to power electronic technologies, and in particular to a light emitting diode (LED) drive circuit with a silicon-controlled rectifier (SCR) dimmer, a circuit module and a control method.

BACKGROUND

At present, dimming is generally performed by SCR dimmers. The SCR dimmer performs dimming by phase control. Specifically, the SCR dimmer is turned on in every half cycle of the sinusoidal wave to obtain the same conduction phase angle. By adjusting the chopping phase of the SCR dimmer, the conduction phase angle can be changed to perform dimming.

The TRIAC (Triode for Alternating current) of the SCR dimmer is characterized by a latching current and a holding current. The latching current is a minimum current required for maintaining the TRIAC in an on state from a time instant at which the gate of the TRIAC is triggered to switch the TRIAC from an off state to an on state. The holding current is another minimum current required to maintain the TRIAC in the on state from an instant at which the TRIAC is turned on. Generally, the holding current is related to the junction temperature, and the latching current is 2 to 4 times of the holding current.

The SCR dimmer is generally used for dimming in incandescent lamps. However, with the popularity of LED light sources, the SCR dimmer is used as a dimming device in more and more LED drive circuits. However, the efficiency of the existing LED drive circuits needs to be improved.

SUMMARY

In view of this, an LED drive circuit with a SCR dimmer, a circuit module and a control method are provided according to present disclosure, to reduce a bleed loss and improve efficiency of the LED drive circuit.

In a first aspect, there is provided a circuit module applied to an LED drive circuit with a SCR dimmer. The circuit module includes a bleeder circuit and a controller.

The bleeder circuit is connected to a direct current bus of the LED drive circuit and controlled to bleed a direct current bus current.

The controller is configured to control the bleeder circuit to perform bleeding at a first current when it is detected that a direct current bus voltage jumps, and then control the bleeder circuit to perform bleeding at a second current until the direct current bus voltage rises to a preset load drive voltage, where the second current is less than the first current.

Preferably, the controller is configured to control the bleeder circuit to perform bleeding at the first current for a preset time period when it is detected that the direct current bus voltage jumps.

Preferably, the controller is further configured to control the bleeder circuit to perform bleeding at the second current when it is detected that the direct current bus voltage reduces to a voltage less than the preset load drive voltage.

Preferably, the controller is further configured to control the bleeder circuit to perform bleeding at a third current when it is detected that the direct current bus voltage reduces to a voltage less than the preset load drive voltage, where the third current is less than the second current.

Preferably, the first current is greater than or equal to a latching current of the SCR dimmer, and the second current is greater than or equal to a holding current of the SCR dimmer.

Preferably, the first current is equal to a latching current of the SCR dimmer, the second current is equal to a holding current of the SCR dimmer, and the third current is less than the holding current of the SCR dimmer.

Preferably, the controller is configured to detect whether the direct current bus voltage jumps based on a direct current bus sampling signal and a delay signal of the direct current bus sampling signal.

Preferably, the controller is configured to control the bleeder circuit to perform bleeding at different currents by switching a bleeding current reference voltage.

Preferably, the bleeder circuit includes a controlled current source connected between the direct current bus and a ground terminal. The controller includes an error amplifier, a current reference signal switching circuit, and a mode selection circuit.

The error amplifier is configured to receive a bleeding current reference signal and a bleeding current sampling signal, and output a control signal to control the controlled current source.

The mode selection circuit is configured to output a selection signal. The mode selection circuit outputs the selection signal indicating a first voltage being selected before a preset time period elapses since it is detected that the direct current bus voltage jumps.

The current reference signal switching circuit is configured to select, in response to the selection signal, the first voltage or a second voltage as the bleeding current reference signal.

The first voltage corresponds to the first current, and the second voltage corresponds to the second current.

Preferably, the mode selection circuit includes a comparator, a delay circuit, an offset voltage source, and a one-shot circuit.

The comparator has a first input terminal and a second input terminal, where the first input terminal receives a direct current bus voltage sampling signal.

The delay circuit and the offset voltage source are connected in series between a direct current bus voltage sampling signal input terminal and the second input terminal of the comparator.

The one-shot circuit is configured to output, in response to a transition of an output signal of the comparator, a pulse signal having a preset duration as the selection signal.

Preferably, the bleeder circuit includes a controlled current source connected between the direct current bus and a ground terminal. The controller includes an error amplifier, a current reference signal switching circuit, and a mode selection circuit.

The error amplifier is configured to receive a bleeding current reference signal and a bleeding current sampling signal, and output a control signal to control the controlled current source.

The mode selection circuit is configured to output a selection signal. The mode selection circuit outputs the selection signal for indicating the first voltage being selected before a preset time period elapses since it is detected that the direct current bus voltage jumps, and output the selection signal for indicating the third voltage being selected when it is detected that the direct current bus voltage reduces to a voltage less than the preset load drive voltage.

The current reference signal switching circuit is configured to select, in response to the selection signal, one of the first voltage, a second voltage and the third voltage as the bleeding current reference signal.

The first voltage corresponds to the first current, the second voltage corresponds to the second current, and the third voltage corresponds to the third current.

Preferably, the mode selection circuit includes a comparator, a delay circuit, an offset voltage source, a one-shot circuit, a first logic circuit, and a second logic circuit.

The comparator has a first input terminal and a second input terminal, where the first input terminal receives a direct current bus voltage sampling signal.

The delay circuit and the offset voltage source are connected in series between a direct current bus voltage sampling signal input terminal and the second input terminal of the comparator.

The one-shot circuit is configured to output, in response to a transition of an output signal of the comparator, a pulse signal having a preset duration as a first selection sub-signal.

The first logic circuit configured to output a valid third selection sub-signal in a case that the direct current bus voltage is less than the preset load drive voltage and greater than an offset voltage of the offset voltage source.

The second logic circuit configured to output a valid second selection sub-signal in a case that both the first selection sub-signal and the third selection sub-signal are invalid.

The selection signal includes the first selection sub-signal, the second selection sub-signal and the third selection sub-signal.

The current reference signal switching circuit outputs the first voltage in a case that the first selection sub-signal is valid, outputs the second voltage in a case that the second selection sub-signal is valid, and outputs the third voltage in a case that the third selection sub-signal is valid.

In a second aspect, there is provided a control method for controlling a bleeder circuit for an LED drive circuit with a SCR dimmer. The control method includes:
controlling the bleeder circuit to perform bleeding at a first current when it is detected that a direct current bus voltage jumps; and
controlling the bleeder circuit to perform bleeding at a second current until the direct current bus voltage rises to a preset load drive voltage, where
the second current is less than the first current.

Preferably, the controlling the bleeder circuit to perform bleeding at the first current includes:
controlling the bleeder circuit to perform bleeding at the first current for a preset time period.

Preferably, the method further includes:
controlling the bleeder circuit to perform bleeding at the second current when it is detected that the direct current bus voltage reduces to a voltage less than the preset load drive voltage.

Preferably, the method further includes:
controlling the bleeder circuit to perform bleeding at a third current when it is detected that the direct current bus voltage reduces to a voltage less than the preset load drive voltage, where the third current is less than the second current.

Preferably, the first current is greater than or equal to a latching current of the SCR dimmer, and the second current is greater than or equal to a holding current of the SCR dimmer.

Preferably, the first current is equal to a latching current of the SCR dimmer, the second current is equal to a holding current of the SCR dimmer, and the third current is less than the holding current of the SCR dimmer.

Preferably, whether the direct current bus voltage jumps is detected based on a difference between a direct current bus sampling signal and a delay signal of the direct current bus sampling signal.

Preferably, the control method further includes controlling the bleeder circuit to perform bleeding at different currents by switching a bleeding current reference voltage.

In a second aspect, there is provided an LED drive circuit with a SCR dimmer. The LED drive circuit includes the above circuit module.

In each cycle of the alternating current, the bleeding current during a time period for turning on the SCR dimmer, is distinguished from the bleeding current in a time period from an instant at which the SCR dimmer is turned on to an instant at which the LED load is lit. The bleeder circuit is controlled to perform bleeding at the first current during the time period for turning on the SCR dimmer, and then perform bleeding at the second current which is less than the first current from the instant at which the SCR dimmer is turned on, so that an average bleeding current of the bleeder circuit in each cycle can be reduced, the bleed loss can be reduced, and the efficiency of the LED drive circuit can be improved.

BRIEF DESCRIPTION OF THE DRAWINGS

The above and other objects, features, and advantages of the present disclosure are apparent from the following description of the embodiments of the present disclosure with reference to the drawings. In the drawings.

DETAILED DESCRIPTION OF EMBODIMENTS

The present disclosure is described below based on embodiments, and the present disclosure is not limited to the embodiments. In the following description of the present disclosure, specific details are described in detail. The present disclosure can be fully understood by those skilled in the art without the description of these details. Well-known methods, processes, flows, components and circuits are not described in detail to avoid obscuring the essence of the present disclosure.

Further, it should be understood by those skilled in the art that, the drawings herein are only for illustration, and are not necessarily drawn to scale.

It should further be understood that in the following description, a "circuit" indicates a conductive loop formed by at least one component or sub-circuit by electrical connection or electromagnetic connection. In a case that a component or circuit is referred to as being "connected to" another component or being "connected" between two nodes, the component or circuit may be directly coupled or connected to another component, or an intermediate component may exist between the two components. The connection between the two components may be physical connection, logical connection, or a combination thereof. In addition, in a case that the component is referred to as being "directly coupled to" or "directly connected to" another component, it indicates that no intermediate component exists between the two components.

Unless otherwise indicated in the context, the words "including", "comprising", and the like, in the specification and the claims, should be interpreted as comprising rather than being exclusive or exhaustive, i.e., "including but not limited to".

In the description of the present disclosure, it should be understood that, the terms "first", "second", and the like are only for descriptive purposes and are not to be construed as indicating or implying relative importance. In addition, in the description of the present disclosure, the term "multiple" indicates two or more unless otherwise specified.

Figure 1:
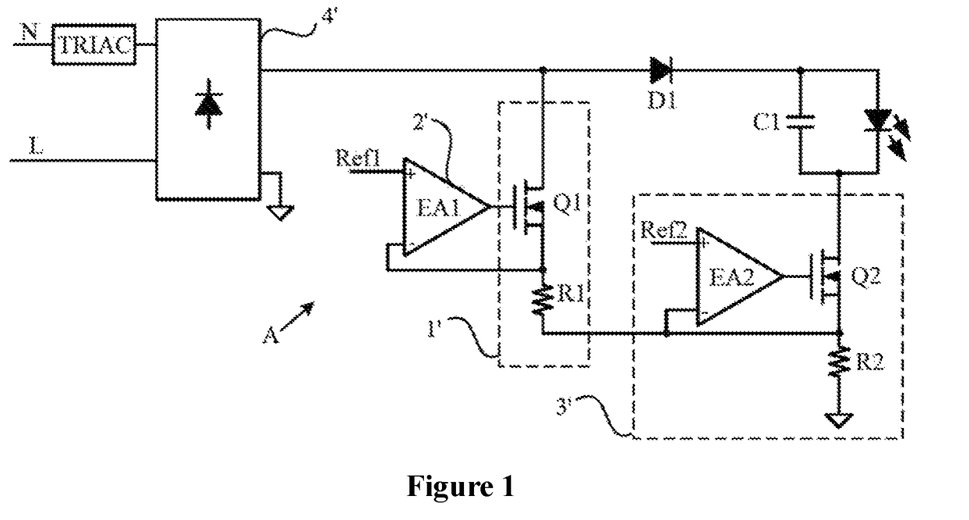
FIG. 1 is a circuit diagram of an LED drive circuit in a comparative example.
Figure 2:
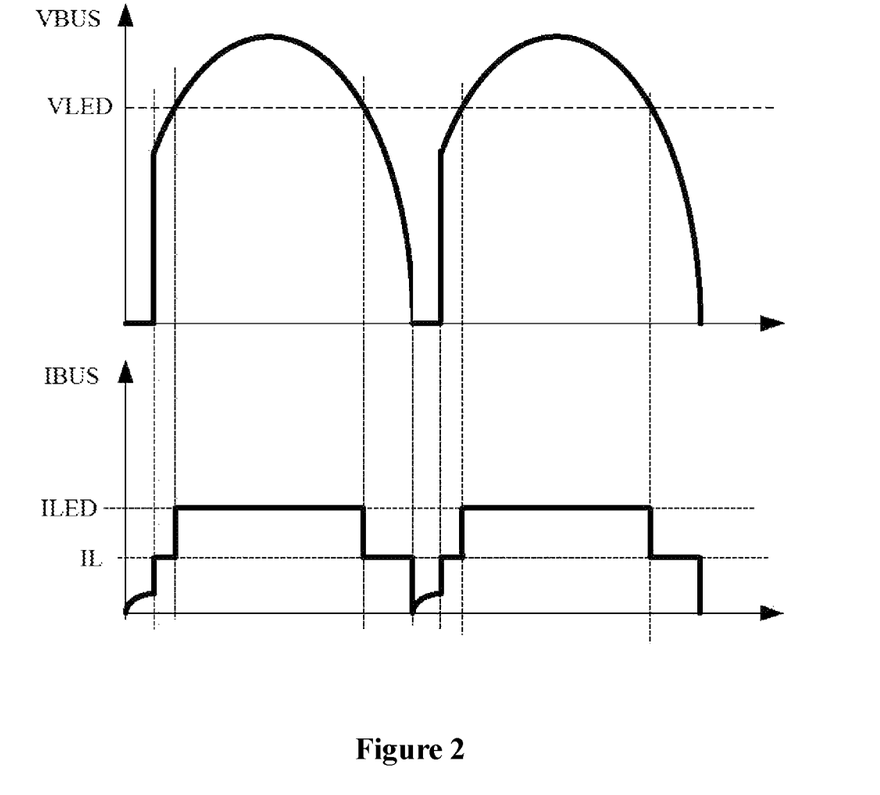
FIG. 2 is a waveform diagram showing operation of the LED drive circuit in the comparative example.

FIG. 1 is a circuit diagram of an LED drive circuit with a SCR dimmer in a comparative example. FIG. 2 is a waveform diagram showing operation of the LED drive circuit in the comparative example. As shown in FIG. 1 and FIG. 2, an LED drive circuit A includes a SCR dimmer TRIAC, a bleeder circuit 1', a controller 2', a constant current control circuit 3' and a rectification circuit 4'. The LED drive circuit A may further include a diode D1 connected in a direct current bus BUS and a filter capacitor C1 connected in parallel with an LED load. Further, the SCR dimmer TRIAC is connected between the rectification circuit 4' and an alternating current input terminal for chopping an inputted alternating current. The rectification circuit 4' is used for converting an alternating current into a direct current and output the direct current to the direct current bus BUS. The constant current control circuit 3' is substantially in series connection with the LED load. The constant current control circuit 3' controls a transistor Q2 to operate in a linear state so that a current flowing through the LED load is constant and controllable. The constant current control circuit 3' may include the transistor Q2, a resistor R2, and an error amplifier EA2 for controlling the transistor. The transistor Q2 is connected between the LED load and the resistor R2. One terminal of the resistor R2 is connected to a source of the transistor Q2. A gate of the transistor Q2 is connected to an output terminal of the error amplifier EA2. One of the input terminals (a non-inverting input terminal) of the error amplifier EA2 receives a load current reference signal Ref2, and the other input terminal (an inverting input terminal) of the error amplifier EA2 is connected to the source of the transistor Q2. A current flowing through the transistor Q2 produces a voltage drop across the resistor R2. Therefore, a voltage at the inverting input terminal of the error amplifier EA2 may indicate the current flowing through the transistor Q2, and the output of the error amplifier EA2 changes with the load current, thereby forming a closed current loop. The transistor Q2 is controlled by the output signal of the error amplifier EA2 to operate in the linear state and regulate the current flowing through the transistor Q2 so that the current coincides with the load current reference signal Ref2.

Further, the bleeder circuit 1' is substantially connected in parallel with a circuit formed by the LED load and the constant current control circuit 3. The bleeder circuit 1' is used for bleeding a direct current bus current in a time period during which the SCR dimmer TRIAC is not turned on and in a time period during which a direct current bus voltage is less than a preset load drive voltage VLED. In FIG. 1, the bleeder circuit 1' includes a transistor Q1 and a resistor R1. The resistor R1 is connected between a source of the transistor Q1 and a terminal of the resistor R2 away from a grounded terminal. The transistor Q1 is connected between the direct current bus BUS and the resistor R1. The bleeder circuit 1' is controlled by the controller 2' to bleed. In FIG. 1, the controller 2' includes an error amplifier EA1. A non-inverting input terminal of the error amplifier EA1 receives a bleeding current reference signal Ref1, an inverting input terminal of the error amplifier EA1 receives a voltage at a high voltage terminal of the resistor R2, and an output terminal of the error amplifier EA1 is connected to a gate of the transistor Q1. The bleeding current reference signal Ref1 corresponds to a latching current of the TRIAC. In the time period during which the direct current bus voltage VBUS is less than the preset load drive voltage VLED, the transistor Q2 is turned off, and the transistor Q1 is turned on and operates in the linear state to bleed. In order to maintain the operation of the SCR dimmer, the bleeder circuit 1' bleeds at a bleeding current greater than or equal to the latching current IL until the direct current bus voltage VBUS is greater than the load drive voltage VLED. When the direct current bus voltage VBUS rises to a voltage greater than the load drive voltage VLED, the transistor Q2 is controlled to be turned on and to operate in the linear state to regulate the current flowing through the LED load. Further, the voltage applied to the inverting input terminal of the error amplifier EA1 is greater than the bleeding current reference signal Ref1, so that the output of the error amplifier EA1 is negative and the transistor Q1 is turned off. When the direct current bus voltage VBUS reduces to a voltage less than the load drive voltage VLED, the transistor Q2 is turned off again, and the transistor Q1 is turned on again to bleed. As shown in FIG. 2, in each cycle of the alternating current, the bleeder circuit 1' bleeds the direct current bus current in four different time periods. Since the same bleeding current reference signal is used, the bleeding current is greater than the latching current of the SCR dimmer TRIAC in each of the four time periods, which results in great extra loss and low drive efficiency of the system.

Figure 3:
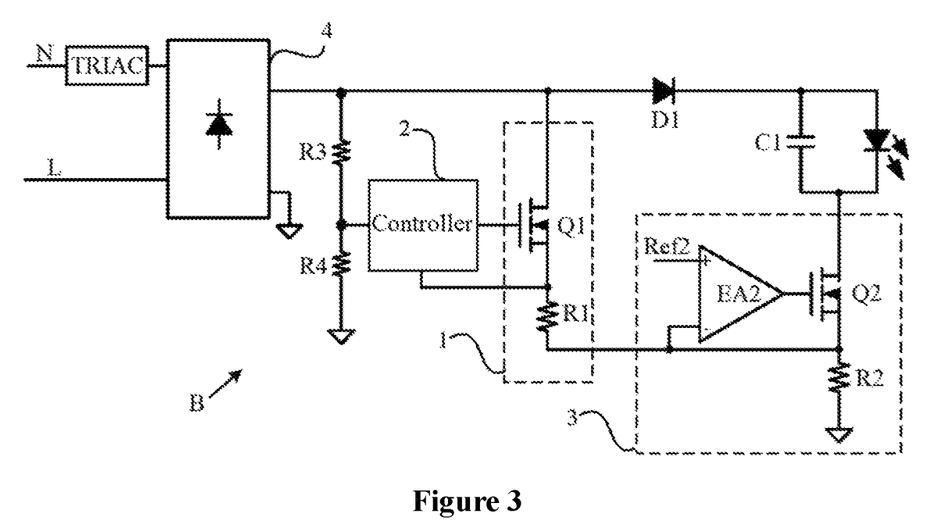
FIG. 3 is a circuit diagram of an LED drive circuit according to an embodiment of the present disclosure.

FIG. 3 is a circuit diagram of an LED drive circuit according to an embodiment of the present disclosure. As shown in FIG. 3, an LED drive circuit B in this embodiment includes a SCR dimmer TRIAC, a bleeder circuit 1, a controller 2, a constant current control circuit 3 and a rectification circuit 4. The LED drive circuit B may further include a diode D1 connected in a direct current bus BUS and a filter capacitor C1 connected in parallel with an LED load. The configuration and connection relationships of the SCR dimmer TRIAC, the rectification circuit 4 and the constant current control circuit 3 are the same as those in FIG. 1, which are not repeated here. It should be understood by those skilled in the art that, although the mechanism which is used for controlling the constant current control circuit 3 to be turned off to avoid the current flowing to the load in a case that the direct current bus voltage does not reach the load drive voltage, is not described in detail in this specification, the control mechanism belongs to the conventional technology and may be implemented by various existing control circuit structures in the conventional technology. It should further be understood by those skilled in the art that, the manner for controlling the load current is not limited to the manner shown in FIG. 3, and other circuits for closed loop control that implement the same function may be adopted. For example, a switching converter is provided to perform the constant current control.

In this embodiment, the bleeder circuit 1 is configured to bleed a direct current bus current under control. In FIG. 3, the bleeder circuit 1 includes a transistor Q1 and a resistor R1 connected between the transistor Q1 and a resistor R2. The resistor R1 functions to detect a current flowing through the transistor Q1 and provide feedback to the controller 2. The transistor Q1 may be controlled by a control terminal (gate) voltage to regulate an intensity of the current flowing through the transistor Q1 and bleed the direct current bus current. It should be understood that, although a metal oxide semiconductor transistor (MOSFET) is used as a linear current regulating device in this embodiment, other controlled current sources or similar devices and circuits, such as an insulated gate bipolar transistor IGBT or a complicated circuit structure including multiple metal oxide semiconductor transistors, may also be applied to this embodiment.

The controller 2 is configured to control the bleeder circuit 1 to perform bleeding at a first current when it is detected that a direct current bus voltage VBUS jumps. Preferably, the bleeder circuit 1 is controlled to perform bleeding at the first current for a preset time period. The bleeder circuit 1 is then controlled to perform bleeding at a second current until the direct current bus voltage rises to a preset load drive voltage. When the SCR dimmer is turned on, the direct current bus voltage changes from zero to a non-zero value in a short time period. Therefore, an activated time instant or a turned-on time instant of the SCR dimmer may be detected by detecting a jump in the direct current bus voltage. The first current corresponds to a latching current, and the second current corresponds to a holding current. Specifically, the first current should be set to be greater than or equal to the latching current, and the second current should be set to be greater than or equal to the holding current. The preset time period corresponds to a duration for which the latching current is required to be maintained when activating (or turning on) the SCR dimmer, and the preset time period should be set to be greater than or equal to the above duration for which the latching current is required to be maintained. The preset time period may be determined based on measurement data acquired through experiments performed in advance.

Preferably, the controller 2 detects whether the direct current bus voltage jumps based on a direct current bus sampling signal and a delay signal of the direct current bus sampling signal.

Preferably, the first current may be set to be equal to the latching current, and the second current may be set to be equal to the holding current, in order to reduce the loss as much as possible.

The latching current is generally 2 to 4 times of the holding current. Further, the duration for which the latching current is to be maintained when activating (or turning on) the SCR dimmer is short. Therefore, in this embodiment, an average bleeding current of the bleeder circuit in each cycle can be reduced such that the bleed loss can be reduced, and the efficiency of the LED drive circuit can be improved.

Further, the controller 2 is further configured to control the bleeder circuit 1 to perform bleeding at the second current when it is detected that the direct current bus voltage VBUS reduces to a voltage less than the preset load drive voltage VLED. In other words, the controller 2 in this embodiment controls the bleeder circuit to perform bleeding at the first current before a preset time period elapses since it is detected that the direct current bus voltage jumps, and controls the transistor Q1 to be turned off or controls the bleeder circuit to perform bleeding at the second current less than the first current during other time periods. In this way, the bleed loss can be further reduced.

Specifically, the controller 2 achieves the above effect by switching a bleeding current reference signal Refx.

In FIG. 3, the controller 2 acquires a direct current bus voltage sampling signal by using a resistive voltage division circuit (including resistors R3 and R4) connected between the direct current bus BUS and the ground terminal. In addition, the controller 3 may also directly detect the direct current bus voltage for control.

It should be understood that, in this embodiment, the bleeder circuit and the controller may be formed by an integrated circuit or may be formed by discrete components. More preferably, the bleeder circuit 1 and the controller 2 may be formed in the same integrated circuit chip together with the constant current control circuit 3 and/or the rectification circuit.

Figure 4:
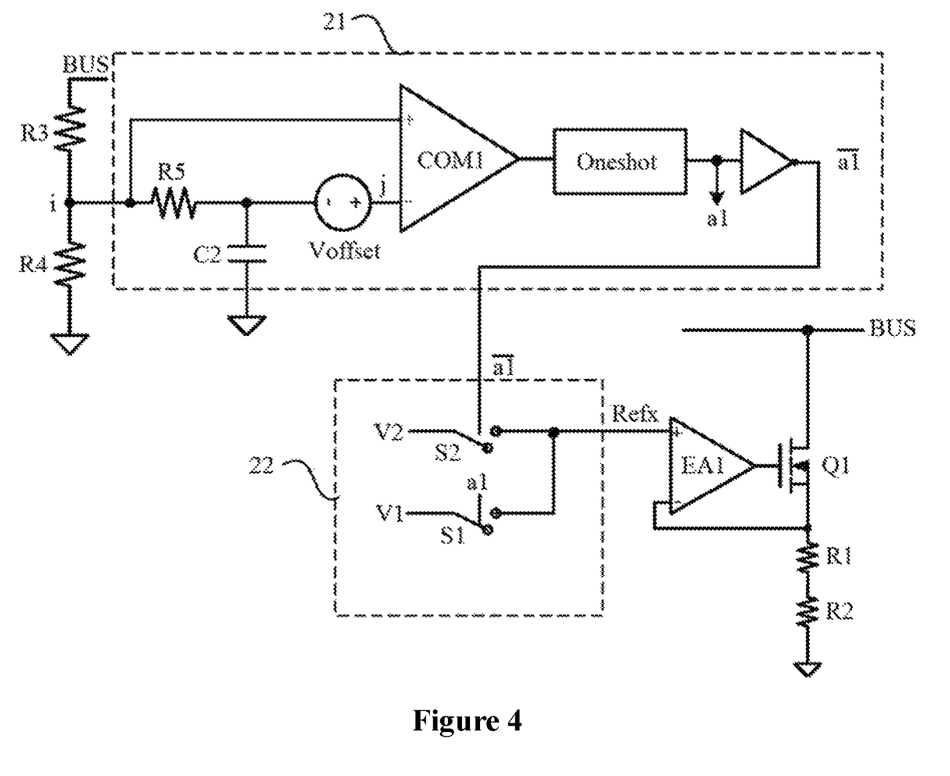
FIG. 4 is a circuit diagram of a controller according to an embodiment of the present disclosure.

FIG. 4 is a circuit diagram of a controller according to an embodiment of the present disclosure. As shown in FIG. 4, the controller 2 includes a mode selection circuit 21, a current reference signal switching circuit 22 and an error amplifier EA1. The mode selection circuit 21 outputs a selection signal a1. That is, the mode selection circuit 21 outputs a selection signal for indicating the first voltage being selected before a preset time period elapses since it is detected that the direct current bus voltage jumps. In FIG. 4, the mode selection circuit 21 includes a comparator COM1, a delay circuit, an offset voltage source Voffset, and a one-shot circuit Oneshot. The comparator COM1 has a first input terminal and a second input terminal, where the first input terminal is connected to a direct current bus voltage sampling signal input terminal i. The delay circuit is used for delaying the signal at the input terminal i for a preset time period and output a delayed waveform. The delay circuit in FIG. 4 is an RC circuit including a resistor R5 and a capacitor C2. The delay circuit and the offset voltage source Voffset are connected in series between the direct current bus voltage sampling signal input terminal i and the second input terminal j of the comparator COM1. That is, the two input terminals of the comparator COM1 respectively receive a voltage Vi at the point i and a voltage Vj at the point j. The one-shot circuit Oneshot outputs a pulse signal a1 having a preset duration in response to a transition of an output signal of the comparator, as the selection signal. In this embodiment, the one-shot circuit Oneshot outputs a pulse having the preset duration in response to a rising edge of an input signal. It should be understood that the one-shot circuit Oneshot may also be set to be triggered by a falling edge depending on the connection relationship.

The current reference signal switching circuit 22 selects the first voltage V1 or a second voltage V2 as the bleeding current reference signal Refx in response to the selection signal a1. The first voltage V1 corresponds to the first current, and the second voltage V2 corresponds to the second current. That is, in a case that the first voltage V1 is used as the bleeding current reference signal, the bleeder circuit 1 is controlled to perform bleeding at the first current. In a case that the second voltage V2 is used as the bleeding current reference signal, the bleeder circuit 1 is controlled to perform bleeding at the second current. In FIG. 4, the current reference signal switching circuit 22 includes two switches S1 and S2. One terminal of the switch S1 is connected to a non-inverting terminal of the error amplifier EA1, and the other terminal of the switch S1 is applied with the first voltage V1. One terminal of the switch S2 is connected to the non-inverting terminal of the error amplifier EA1, and the other terminal of the switch S2 is applied with the second voltage V2. The switch S1 is controlled by the signal a1, and the switch S2 is controlled by an inverted signal of the signal a1. Therefore, only one of the switches S1 and S2 is turned on at a certain time instant, so that only one of the first voltage V1 and the second voltage V2 can be outputted.

Figure 5:
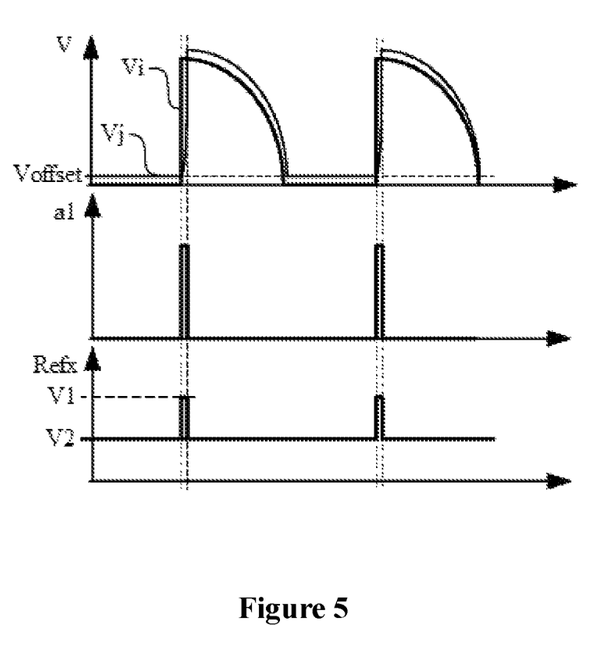
FIG. 5 is a waveform diagram showing operation of the controller according to the embodiment of the present disclosure.

FIG. 5 is a waveform diagram showing operation of the controller according to this embodiment. As shown in FIG. 5, in a time period during which the SCR dimmer is not turned on, the direct current bus voltage VBUS is zero, and the corresponding direct current bus voltage sampling signal (i.e., the voltage Vi at the point i) is zero. During turning on of the SCR dimmer, the direct current bus voltage VBUS jumps to a non-zero value. From the time instant at which the SCR dimmer is turned on, the direct current bus voltage VBUS changes in a sinusoidal waveform until crossing zero. In addition, the voltage Vi at the point i changes in the same waveform as the direct current bus voltage VBUS. The voltage Vj at the point j is obtained by delaying and offsetting the voltage Vi, and a waveform of the voltage Vj is delayed relative to the waveform of the voltage Vi and is superposed with the offset voltage Voffset. It can be seen from the waveform in FIG. 5 that, when the voltage waveform does not change dramatically, the voltage Vj superposed with the offset voltage is greater than the voltage Vi. However, when the direct current bus voltage jumps, the voltage Vi is greater than the voltage Vj due to a dramatic voltage change in a short time period, so that the comparator COM1 outputs a rising edge. The one-shot circuit Oneshot may output the pulse signal a1 having a preset duration in response to the rising edge. The switch S1 is turned on in response to the selection signal a1, the switch S2 is turned off, and the higher first voltage V1 is outputted as the bleeding current reference signal. The error amplifier EA1 controls, based on the first voltage V1, the bleeder circuit 1 to perform bleeding at the first current, i.e., V1/(R1+R2). At the end of the preset time period, the signal a1 changes to a low level, the switch S1 is turned off and the switch S2 is turned on in response to the selection signal a1, and the lower second voltage V2 is outputted as the bleeding current reference signal Refx. The error amplifier EA1 controls, based on the second voltage V2, the bleeder circuit 1 to perform bleeding at the second current, i.e., V2/(R1+R2).

Figure 6:
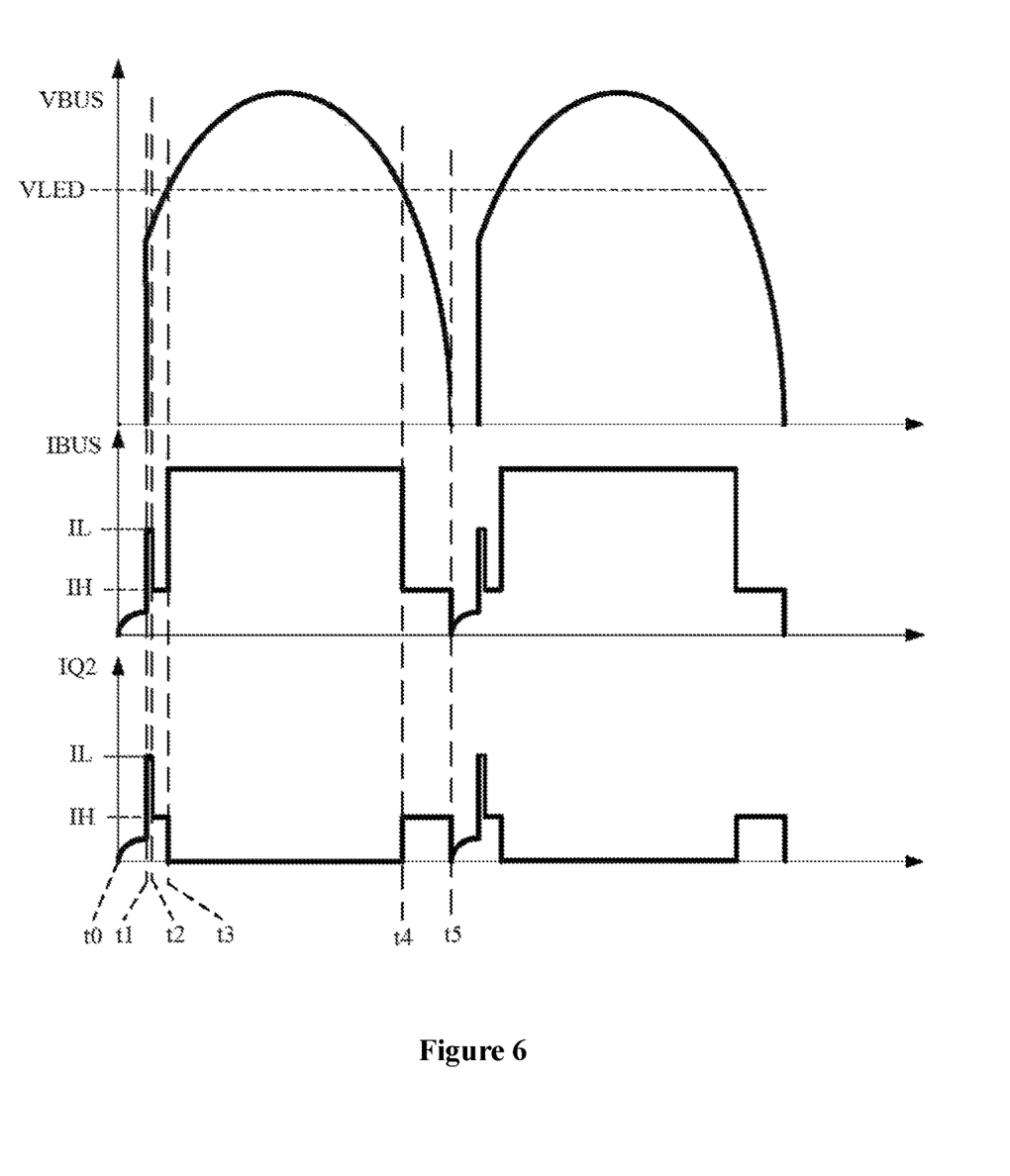
FIG. 6 is a waveform diagram showing operation of the LED drive circuit according to the embodiment of the present disclosure.

FIG. 6 is a waveform diagram showing operation of the LED drive circuit according to this embodiment. As shown in FIG. 6, during a time period from t0 to t1, the SCR dimmer TRIAC is not turned on, thus the direct current bus voltage VBUS is zero. During this time period, the transistor Q2 is maintained in the off state, and the current flowing through the load is zero, while the transistor Q1 is turned on, and a certain amount of current is bled. At a time instant t1, the SCR dimmer is turned on, which causes the direct current bus voltage VBUS to jump. On detection of the jump, the controller 2 controls the bleeder circuit 1 to perform bleeding at a first current greater than or equal to the latching current IL in a preset time period (from t1 to t2). At the end of the preset time period, the controller 2 controls the bleeder circuit 1 to perform bleeding at a second current greater than or equal to the holding current IH until the direct current bus voltage VBUS rises to a preset load drive voltage VLED (from t2 to t3). During a time period from t3 to t4, the transistor Q2 is turned on, the transistor Q1 is turned off, and the LED load is driven by the direct current bus current to operate. At a time instant t4, the direct current bus voltage VBUS reduces to a voltage less than the load drive voltage VLED. The transistor Q2 is turned off again, and the transistor Q1 is turned on again. During a time period from t4 to t5, the control circuit 2 controls the bleeder circuit 1 to perform bleeding at the second current until the direct current bus voltage crosses zero. It can be seen from FIG. 6 that the bleeding current IQ2 is a much less than the latching current IL during the time period from t2 to t3 and during the time period from t4 to t5. The system loss may be calculated from the following equation:

$$\int_{t0}^{t3}(VBUS \times IQ2)dt + \int_{t4}^{t5}(VBUS \times IQ2)dt$$

A time period during which the bleeding current IQ2 is the first current is short. Therefore, as compared with the comparative example, the bleed loss is greatly reduced in this embodiment, thus the system efficiency is improved.

Further, in another embodiment, when the direct current bus voltage VBUS reduces from a peak value to a voltage less than the load drive voltage VLED, a light emitting cycle of the LED load ends, and the SCR dimmer is not required to remain in operation before the next cycle starts. Therefore, bleeding may be performed at a smaller current during this time period to further reduce the loss. Specifically, in this embodiment, the controller 2 may be configured to control the bleeder circuit to perform bleeding at a third current when it is detected that the direct current bus voltage VBUS reduces to a voltage less than the preset load drive voltage. The third current is less than the second current and is less than the holding current of the SCR dimmer.

Figure 7:
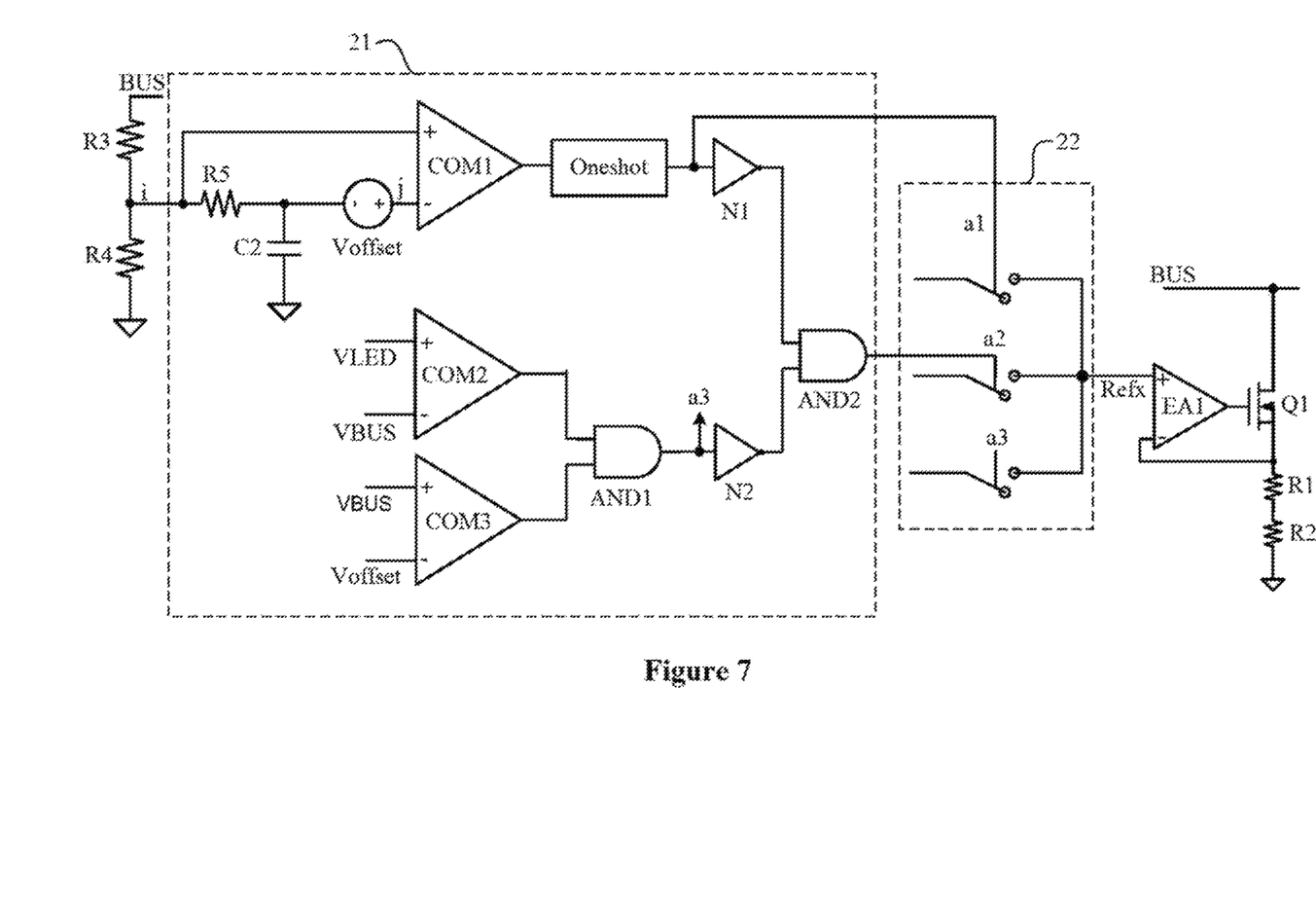
FIG. 7 is a circuit diagram of a controller according to another embodiment of the present disclosure.

FIG. 7 is a circuit diagram of a controller according to another embodiment of the present disclosure. As shown in FIG. 7, a controller 2 according to this embodiment includes a mode selection circuit 21, a current reference signal switching circuit 22 and an error amplifier 23. The mode selection circuit 21 outputs a selection signal for indicating a first voltage being selected before a preset time period elapses since it is detected that a direct current bus voltage jumps, and outputs a selection signal for indicating a third voltage being selected when it is detected that the direct current bus voltage reduces to a voltage less than a preset load drive voltage. In addition, the mode selection circuit 21 outputs a selection signal for indicating a second voltage being selected during other time periods. The current reference signal switching circuit 22 selects, in response to the selection signal, one of the first voltage V1, the second voltage V2 and the third voltage V3 as the bleeding current reference signal Refx. The error amplifier EA1 receives the bleeding current reference signal Refx and a bleeding current sampling signal, and outputs a control signal to control the bleeder circuit 1.

In FIG. 7, the mode selection circuit 21 includes a comparator COM1, a delay circuit, an offset voltage source Voffset, a one-shot circuit Oneshot, a first logic circuit and a second logic circuit. The comparator COM1 has a first input terminal and a second input terminal, where the first input terminal is connected to the direct current bus voltage sampling signal input terminal i. The delay circuit is used for delaying the signal at the input terminal i for a preset time period and output a delayed waveform. The delay circuit in FIG. 7 is an RC circuit including a resistor R5 and a capacitor C2. The delay circuit and the offset voltage source Voffset are connected in series between the direct current bus voltage sampling signal input terminal i and the second input terminal j of the comparator COM1. That is, the two input terminals of the comparator COM1 respectively receives a voltage Vi at the point i and a voltage Vj at the point j. The one-shot circuit Oneshot outputs a pulse signal a1 having a preset duration in response to a transition of an output signal of the comparator, as a first selection sub-signal. In this embodiment, the one-shot circuit Oneshot outputs a pulse having the preset duration in response to a rising edge of an input signal. It should be understood that the one-shot circuit Oneshot may also be set to be triggered by a falling edge depending on the connection relationship. The first logic circuit includes comparators COM2 and COM3 and an AND gate AND1. The first logic circuit outputs a third selection sub-signal which is valid in a case that the direct current bus voltage VBUS is less than the preset load drive voltage VLED and greater than the offset voltage Voffset of the offset voltage source. The comparator COM2 is used for comparing the load drive voltage VLED with the direct current bus voltage VBUS. The comparator COM3 is used for comparing the direct current bus voltage VBUS with the offset voltage Voffset. The AND gate AND1 outputs a signal a3 with a high level in a case that the two comparators each output a high level.

The second logic circuit includes NOT gates N1 and N2 and an AND gate AND2. The second logic circuit outputs a second selection sub-signal which is valid in a case that both the first selection sub-signal a1 and the third selection sub-signal are invalid. The first to third selection sub-signals a1 to a3 constitute a selection signal having three bits.

In FIG. 7, the current reference signal switching circuit 22 outputs one of the first voltage V1, the second voltage V2 and the third voltage V3 based on the three selection sub-signals. The current reference signal switching circuit 22 includes three switches S1 to S3. One terminal of each of the switches S1 to S3 is connected to a non-inverting terminal of the error amplifier EA1, and the other terminals of the switches S1 to S3 respectively receives the first voltage V1, the second voltage V2, and the third voltage V3. The switch S1 is controlled by the signal a1, the switch S2 is controlled by the signal a2, and the switch S3 is controlled by the signal a3. Only one of the three switches is turned on at a certain time instant.

Figure 8:
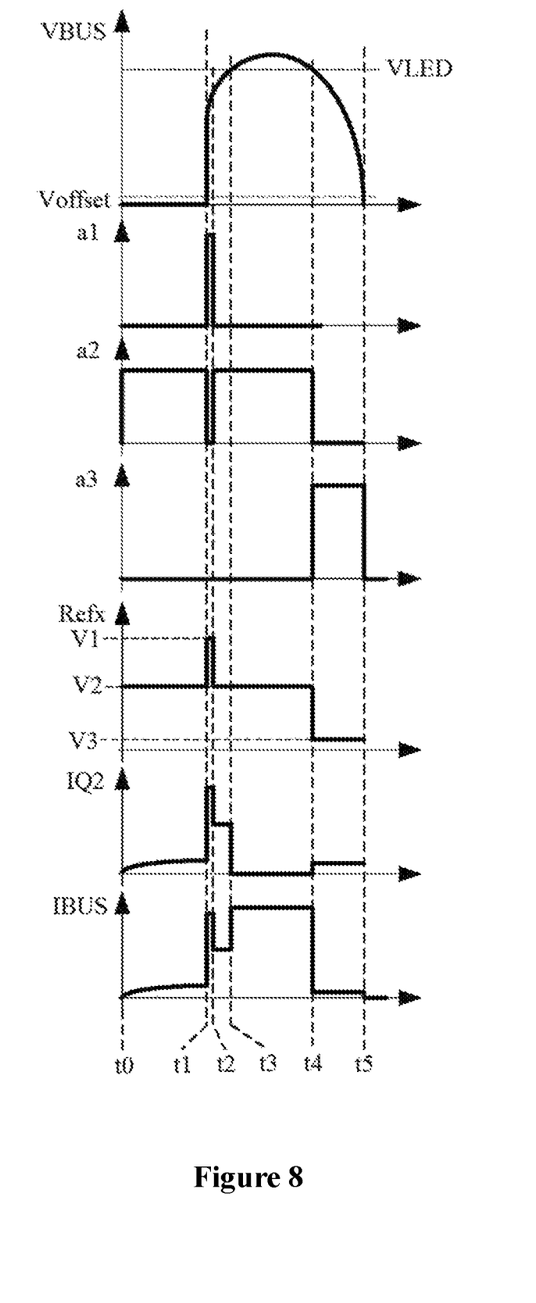
FIG. 8 is a waveform diagram showing operation of an LED drive circuit according to another embodiment of the present disclosure.

FIG. 8 is a waveform diagram showing operation of the LED drive circuit according to this embodiment. As shown in FIG. 8, during a time period from t0 to t1, the SCR dimmer TRIAC is not turned on, thus the direct current bus voltage VBUS is zero. During this time period, the transistor Q2 is maintained in the off state, and the current flowing through the load is zero, while the transistor Q1 is turned on, and a certain amount of current is bled. At a time instant t1, the SCR dimmer is turned on, which causes the direct current bus voltage VBUS to jump. On detection of the jump, the controller 2 controls the bleeder circuit 1 to perform bleeding at a first current greater than or equal to the latching current IL in a preset time period (from t1 to t2). At the end of the preset time period, the controller 2 controls the bleeder circuit 1 to perform bleeding at a second current greater than or equal to the holding current IH until the direct current bus voltage rises to a preset load drive voltage VLED (from t2 to t3). The second current is less than the first current. During a time period from t3 to t4, the transistor Q2 is turned on, the transistor Q1 is turned off, and the LED load is driven by the direct current bus current to operate. At a time instant t4, the direct current bus voltage VBUS reduces to a voltage less than the load drive voltage VLED. The transistor Q2 is turned off again, and the transistor Q1 is turned on again. During a time period from t4 to t5, the control circuit 2 controls the bleeder circuit 1 to perform bleeding at the third current until the direct current bus voltage crosses zero. In this embodiment, the third current is set as low as possible. Thus, during the time period from t4 to t5, the bleeder circuit 1 bleeds at a low bleeding current, thereby minimizing the loss and optimizing the system efficiency.

Figure 9:
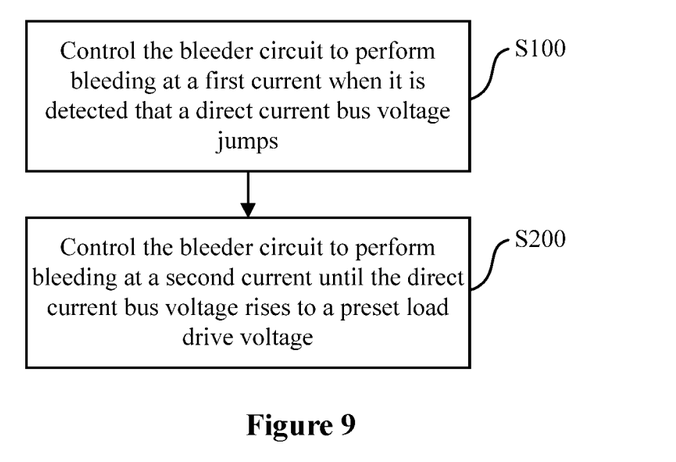
FIG. 9 is a flowchart showing a control method according to an embodiment of the present disclosure.

FIG. 9 is a flowchart showing a control method for a bleeder circuit according to an embodiment of the present disclosure. As shown in FIG. 9, the method includes the following steps S100 and S200.

In step S100, when it is detected that a direct current bus voltage jumps, the bleeder circuit is controlled to perform bleeding at a first current.

Specifically, the bleeder circuit may be controlled to perform bleeding at the first current for a preset time period.

Whether the direct current bus voltage jumps is detected based on a difference between a direct current bus sampling signal and a delay signal of the direct current bus sampling signal.

In step S200, the bleeder circuit is controlled to perform bleeding at a second current until the direct current bus voltage rises to a preset load drive voltage.

Preferably, the method may further include the following step S300.

In step S300, the bleeder circuit is controlled to perform bleeding at the second current or a third current when the direct current bus voltage reduces to a voltage less than the preset load drive voltage.

The bleeder circuit is controlled to perform bleeding at different currents by switching a bleeding current reference voltage.

The first current is greater than the second current, and the second current is greater than the third current. The first current corresponds to a latching current of the SCR dimmer and may be set to be greater than or equal to the latching current. The second current corresponds to a holding current of the SCR dimmer and may be set to be greater than or equal to the holding current. The third current may be set to a minimum allowable value to minimize the loss.

According to this embodiment, in each cycle of the alternating current, the bleeding current during a time period for turning on the SCR dimmer, is distinguished from the bleeding current in a time period from an instant at which the SCR dimmer is turned on to an instant at which the LED load is lit. The bleeder circuit is controlled to perform bleeding at the first current during the time period for turning on the SCR dimmer, and then perform bleeding at the second current which is less than the first current from the instant at which the SCR dimmer is turned on, so that an average bleeding current of the bleeder circuit in each cycle can be reduced, the bleed loss can be reduced, and the efficiency of the LED drive circuit can be improved.

It should be understood by those skilled in the art that, although the controller described above is constructed by using an analog circuit, the controller may also be constructed by using a digital circuit in combination with a digital to analog/analog to digital conversion device. The digital circuit may be implemented in one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and other electronic units for performing the functions described herein, or a combination thereof. For firmware or software implementation, the technologies in the embodiments of the present disclosure may be implemented by modules (e.g., procedures, functions) performing the functions described in the present disclosure. These software codes can be stored in a memory and executed by a processor. The memory may be implemented in the processor or outside the processor. In the latter case, the memory may be communicatively connected to the processor in various manners, which is well known in the art.

The foregoing are merely preferred embodiments of the present disclosure and are not intended to limit the present disclosure, and those skilled in the art can make various modifications and variations to the present disclosure. Any modifications, equivalent substitutions and improvements within the spirit and the principle of the present disclosure are within the protection scope of the present disclosure.

The invention claimed is:

1. A circuit module applied to a light emitting diode (LED) drive circuit with a silicon-controlled rectifier (SCR) dimmer, comprising:
a bleeder circuit connected to a direct current bus of the LED drive circuit; and
a controller configured to control the bleeder circuit to generate a variable bleeding current to guarantee a conduction state of the SCR dimmer and to decrease a power loss of the bleeder circuit, wherein
the bleeder circuit is controlled to perform bleeding at a first current in a time interval including a moment when a direct current bus voltage jumps, and then controlled to perform bleeding at a second current until the direct current bus voltage rises to a load drive voltage, the second current is less than the first current, the first current is greater than or equal to a latching current of the SCR dimmer, and the second current is greater than or equal to a holding current of the SCR dimmer.

2. The circuit module according to claim 1, wherein a duration of the second current includes a moment when the direct current bus voltage rises to the load drive voltage.

3. The circuit module according to claim 1, wherein the controller is configured to control the bleeder circuit to perform bleeding at the first current for a preset time period, wherein the preset time period is set to be greater than or equal to a duration for which the latching current is required to be maintained.

4. The circuit module according to claim 1, wherein the controller is further configured to control the bleeder circuit to perform bleeding at a third current when it is detected that the direct current bus voltage reduces to a threshold voltage.

5. The circuit module according to claim 4, wherein the third current is not greater than the second current.

6. The circuit module according to claim 4, wherein the threshold voltage is configured as the load drive voltage.

7. The circuit module according to claim 1, wherein the controller is configured to determine when to generate the bleeding current based on a sampling signal representing the direct current bus voltage.

8. The circuit module according to claim 1, wherein the controller is configured to control the bleeder circuit to perform bleeding at different currents by switching a bleeding current reference voltage.

9. The circuit module according to claim 1, wherein
the bleeder circuit comprises a controlled current source coupled between the direct current bus and a ground terminal; and
the controller comprises:
mode selection circuit configured to output a selection signal representing one of a plurality of bleeding current reference voltages;
a current reference signal switching circuit configured to select, in response to the selection signal, corresponding one of the bleeding current reference voltages as the bleeding current reference signal; and
an error amplifier configured to output a control signal to control the controlled current source in accordance with the bleeding current reference voltage and a bleeding current sampling signal.

10. The circuit module according to claim 9, wherein the mode selection circuit comprises:
a comparator having a first input terminal and a second input terminal, wherein the first input terminal receives a direct current bus voltage sampling signal;
a delay circuit and an offset voltage source which are coupled in series between a direct current bus voltage sampling signal input terminal and the second input terminal of the comparator; and
a one-shot circuit configured to output, in response to a transition of an output signal of the comparator, a pulse signal having a preset duration as the selection signal.

11. A light emitting diode (LED) drive circuit with a silicon-controlled rectifier (SCR) dimmer, comprising:
the SCR dimmer; and
the circuit module according to claim 1.

12. The circuit module according to claim 1, wherein the direct current bus voltage is configured to drive an LED load, and when the direct current bus voltage is greater than the load drive voltage of the LED load, the LED load is on.

13. A control method for controlling a bleeder circuit for a light emitting diode (LED) drive circuit with a silicon-controlled rectifier (SCR) dimmer, comprising:
controlling the bleeder circuit to generate a variable bleeding current to guarantee a conduction state of the SCR dimmer and to decrease a power loss of the bleeder circuit, wherein
the bleeder circuit is controlled to perform bleeding at a first current in a time interval including a moment when a direct current bus voltage jumps, and then controlled to perform bleeding at a second current until the direct current bus voltage rises to a load drive voltage, the second current is less than the first current, the first current is greater than or equal to a latching current of the SCR dimmer, and the second current is greater than or equal to a holding current of the SCR dimmer.

14. The control method according to claim 13, wherein a duration of the second current includes a moment when the direct current bus voltage rises to the load drive voltage.

15. The control method according to claim 13, wherein the bleeder circuit is controlled to perform bleeding at a third current when it is detected that the direct current bus voltage reduces to a threshold voltage.

16. The control method according to claim 15, wherein the third current is not greater than the second current.

17. The control method according to claim 16, wherein the threshold voltage is configured as the load drive voltage.

18. The control method according to claim 13, wherein the moment when to generate the bleeding current is determined based on a sampling signal representing the direct current bus voltage.

19. The control method according to claim 13, further comprising:
    controlling the bleeder circuit to perform bleeding at different currents by switching a bleeding current reference voltage.

* * * * *